United States Patent
Kaufhold et al.

(10) Patent No.: US 6,590,359 B2
(45) Date of Patent: Jul. 8, 2003

(54) METHOD FOR EFFECTING THE SYNCHRONOUS CONTROL OF SEVERAL STEPPING MOTORS

(75) Inventors: Tobias Kaufhold, Jena (DE); Ralf Joram, Erlangen (DE)

(73) Assignee: Carl Zeiss Jena GmbH, Jena (DE)

(*) Notice: Subject to any disclaimer, the term of this patent is extended or adjusted under 35 U.S.C. 154(b) by 0 days.

(21) Appl. No.: 09/959,110

(22) PCT Filed: Feb. 15, 2001

(86) PCT No.: PCT/EP01/01664
§ 371 (c)(1),
(2), (4) Date: Oct. 17, 2001

(87) PCT Pub. No.: WO01/61837
PCT Pub. Date: Aug. 23, 2001

(65) Prior Publication Data
US 2002/0158592 A1 Oct. 31, 2002

(30) Foreign Application Priority Data
Feb. 17, 2000 (DE) .......................... 100 07 201

(51) Int. Cl.⁷ .................................................. H02P 9/00
(52) U.S. Cl. ........................... 318/562; 318/41; 318/34
(58) Field of Search .............................. 318/41, 34, 49, 318/67, 562, 696

(56) References Cited

U.S. PATENT DOCUMENTS

| | | |
|---|---|---|
| 3,391,318 A | 7/1968 | Hirokawa |
| 4,584,512 A * | 4/1986 | Pritchard ................. 318/696 |
| 5,237,250 A | 8/1993 | Zeile et al. |
| 6,118,945 A * | 9/2000 | Tanaka ..................... 318/696 |

FOREIGN PATENT DOCUMENTS

| | | |
|---|---|---|
| CH | 689 846 | 12/1999 |
| DE | 31 05 491 | 12/1982 |
| DE | 35 25 302 | 7/1987 |
| DE | 197 04 296 | 8/1998 |
| DE | 198 22 256 | 12/1999 |
| GB | 2 058 414 | 4/1981 |
| JP | 60 031499 | 2/1988 |
| JP | 1 206899 | 8/1989 |
| WO | WO 99/60436 | 11/1999 |

* cited by examiner

Primary Examiner—Khanh Dang
(74) Attorney, Agent, or Firm—Reed Smith LLP

(57) ABSTRACT

A method for the synchronized control of a plurality of stepping motors $SM_1$, $SM_2$ ... $SM_n$ which serve as drives in a feed system, wherein the stepping motors $SM_1$, $SM_2$ ... $SM_n$ are controlled with a base frequency $f_a$ and a cycle of the base frequency $f_a$ is proportional to a given step length SL. Different step lengths $SL_1$, $SL_2$ ... $SL_n$ are triggered fith each cycle of the same base frequency $f_a$ in the individual stepping motors $SM_1$, $SM_2$... $SM_n$, wherein a specific step length $SL_1$ is associated with stepping motor $SM_1$, a specific step length $SL_2$ is associated with stepping motor $SM_2$, and so forth. Accordingly, it is no longer required to provide separate control frequencies for every stepping motor. All stepping motors can now be controlled at the same frequency and only a counter unit or timer unit is required for all stepping motors of the positioning system.

4 Claims, 2 Drawing Sheets

METHOD FOR EFFECTING THE SYNCHRONOUS CONTROL OF SEVERAL STEPPING MOTORS

CROSS-REFERENCE TO RELATED APPLICATIONS

This application claims priority of International Application No. PCT/EP01/01664, filed Feb. 15, 2001 and German Application No. 100 07 201.1, filed Feb. 17, 2000, the complete disclosures of which are hereby incorporated by reference.

BACKGROUND OF THE INVENTION a) Field of the Invention

The invention is directed to a method for the synchronized control of a plurality of stepping motors $SM_1, SM_2 \ldots SM_n$ which serve as drives in a feed system, wherein the stepping motors $SM_1, SM_2 \ldots SM_n$ are controlled at a base frequency $f_a$ and a cycle of the base frequency $f_a$ is proportional to a given step length SL.

b) Description of the Related Art

It is known from the prior art to transform the predetermined step angle defined for a stepping motor into increments of a longitudinal movement by controlling and, on this basis, to operate positioning systems by means of which displacements of device component groups along an adjustment area or a path are carried out with high accuracy.

With a suitable arrangement of the coils and phase control of the stepping motor, a sensitive control can be achieved and, therefore, the rotational movement can be advanced in step angles which are so small that even in optical precision instruments, e.g., microscopes with zoom devices, the precise positioning of the individual zoom groups required for changing the magnification while retaining imaging sharpness is achieved.

In the current state of development, typical step angles are 3.75° in permanently excited stepping motors, 1.8° in hybrid stepping motors and 1° in variable reluctance stepping motors. Generally, spindle systems are used to transform the rotational movement into a longitudinal movement.

Positioning systems in which a component group to be displaced along a path is associated with each stepping motor have been developed for applications in zoom objectives as well as for other applications. Particularly in applications for zoom objectives, there is a need to displace the different component groups at different speeds so that, after a displacement, the zoom groups are at a predetermined distance relative to one another, which distance must be sufficient for the newly adjusted magnification and is also required for retaining the imaging sharpness. An "arrangement for direct control of the movement of a zoom system in a stereo microscope" which works on this principle in described, for example, in WO 99/60436.

In the prior art, when controlling a plurality of stepping motors belonging to a positioning system, a counter unit or timer unit is associated with each stepping motor and each path. All counter units and timer units are loaded with different frequencies and times which relate to an associated path and were calculated based on the corresponding positioning task.

The stepping motors are started together and, at the conclusion of a predetermined sequence of cycles of the base frequency or control frequency, the displacement is initiated via output units, wherein an output unit is always associated with a stepping motor. For a further, subsequent adjustment, the counter units or timer units are reloaded and started in corresponding manner.

This sequence is repeated for every new positioning preset and the component groups reach the predetermined destinations on their path each time. In so doing, the component groups are displaced over different path lengths at the same times, i.e., they achieve their target positions at different speeds which are achieved in that the individual stepping motors are controlled with different frequencies.

Since every path also has separate acceleration profiles, particularly for the displacement of zoom groups, a positioning system constructed in this way requires a relatively large storage capacity and, consequently, a rather long calculating time.

In addition, because of the high feed speed that is required—in the present case, the maximum path deviation should be no more than 10 $\mu$m in all drives—every counter unit or timer unit comprises at least three individual counters.

In order to achieve the maximum possible adjustment speed, the stepping motor that must carry out the greatest displacement on the path associated with it is considered as the leading drive, to which all other drives which are assigned shorter feed distances are to be oriented in that they are operated more slowly.

It is clear from the description above that the relatively high expenditure on storage capacity and calculating time is due to the fact that a separate frequency is provided for each individual stepping motor of a positioning system of this type.

OBJECT AND SUMMARY OF THE INVENTION

On this basis, it is the primary object of the invention to further develop a method of the type described in the beginning in such a way that it is possible to control the entire positioning system in a more economical manner while retaining a high positioning accuracy and optimal adjustment speed.

According to the invention, different step lengths $SL_1$, $SL_2 \ldots SL_n$ are triggered with each cycle of the same base frequency $f_a$ in the individual stepping motors $SM_1, SM_2 \ldots SM_n$, wherein a specific step length $SL_1$ is associated with stepping motor $SM_1$, a specific step length $SL_2$ is associated with stepping motor $SM_2$, and so forth.

Accordingly, it is no longer required to provide separate control frequencies for every stepping motor. All stepping motors can now be controlled at the same frequency and only a counter unit or timer unit is required for all stepping motors of the positioning system.

Since every stepping motor travels over the specific step length $SL_1, SL_2 \ldots SL_n$ assigned to it when controlling with one and the same frequency, it is achieved in a simple manner that the individual stepping motors $SM_1, SM_2 \ldots SM_n$ move at different speeds and, at the conclusion of an adjusting movement, each of the component groups to be displaced has traveled over different displacement distances and has reached its target position.

In a preferred construction of the invention, stepping motor $SM_1$, for example, is operated at a step length $SL_1$ which corresponds to the whole step of the stepping motor $SM_1$ during a complete rotating field rotation. The stepping motor $SM_1$ is coupled with a component group which must travel a greater displacement distance than the other component groups when a positioning command is initiated.

Smaller step lengths $SL_2 \ldots SL_n$ corresponding to a partial rotating field rotation are assigned to the rest of the stepping motors $SM_2 \ldots SM_n$. Accordingly, the component groups coupled with these stepping motors $SM_2 \ldots SM_n$ travel shorter displacement distances.

The whole step length $SM_1$ resulting from a complete rotating field rotation is divided into a plurality of partial steps, or microsteps, as they are called, based on the fact that every position of the torque vector within a rotating field rotation is adjustable in theory by adapted control of the currents to be impressed in the individual phases. This type of control is known per se and described for example in Schörlin, F., "Controlling, regulating and driving with stepping motors [Mit Schrittmotoren steuern, regeln und antreiben]", Fransisverlag 1996, second edition, 1996.

A quantity z of discrete microsteps can be generated in this way. For practical use of this effect, division of a whole step into z=100 microsteps is sufficient and is a proven basis for the configuration of positioning systems.

In this respect, one construction of the invention consists in that $SL_1=k_1/z$, $SL_2=k_2/z \ldots SL_n=k_n/z$ is true for step lengths $SL_2 \ldots SL_n$, where $k_1$ to $k_n$ are equivalents of the microsteps to be predetermined per cycle of the base frequency $f_a$.

Assuming that a whole step length corresponding to a complete rotating field rotation is assigned to stepping motor $SM_1$, the equivalence $k_1=100$ is true for stepping motor $SM_1$ when z=100. Consequently, when $k_1=100$, the specific step length $SL_1$ of stepping motor $SM_1$ is 100 microsteps or a whole step, i.e., a displacement distance corresponding to a whole step length or 100 microsteps is initiated at every control pulse or every cycle of the base frequency $f_a$.

For example, if the equivalence $k_n=25$ is assigned to stepping motor $SM_n$, 25/100 microsteps would be initiated via the stepping motor $SM_2$ while controlling at the same base frequency $f_a$ per control pulse 25/100. Consequently, the speed of stepping motor $SM_1$ would be higher than the speed of stepping motor $SM_n$ by a factor of four.

Analogously, this is also true for the rest of the stepping motors $SM_2 \ldots SM_{n-1}$ of the same positioning system when equivalents $k_2 \ldots K_{n-1}$ are assigned to them corresponding to the provided adjustment distance of the respective coupled component groups. In this way, all stepping motors $SM_1, SM_2 \ldots SM_n$ move at different speeds when controlling at the same base frequency $f_a$ and reach the predetermined target positions simultaneously at the end of a predetermined sequence of cycles.

In a particularly preferred construction of the invention, characteristic feed positions, e.g., starting positions, reversing positions and/or stopping positions, are assigned to the individual stepping motors $SM_1, SM_2 \ldots SM_n$ or to the component groups to be displaced on the corresponding path, and the step lengths $SL_1, SL_2 \ldots SL_n$ are predetermined by equivalents $k_1, k_2 \ldots k_n$, depending on the distances between characteristic feed positions on a path, in such a way that the displacement between two feed positions is initiated when all stepping motors $SM_1, SM_2 \ldots SM_n$ are controlled with the same quantity of cycles of the base frequency $f_a$.

The invention will be described more fully in the following with reference to an embodiment example.

DESCRIPTION OF THE PREFERRED EMBODIMENTS

Figure 1:
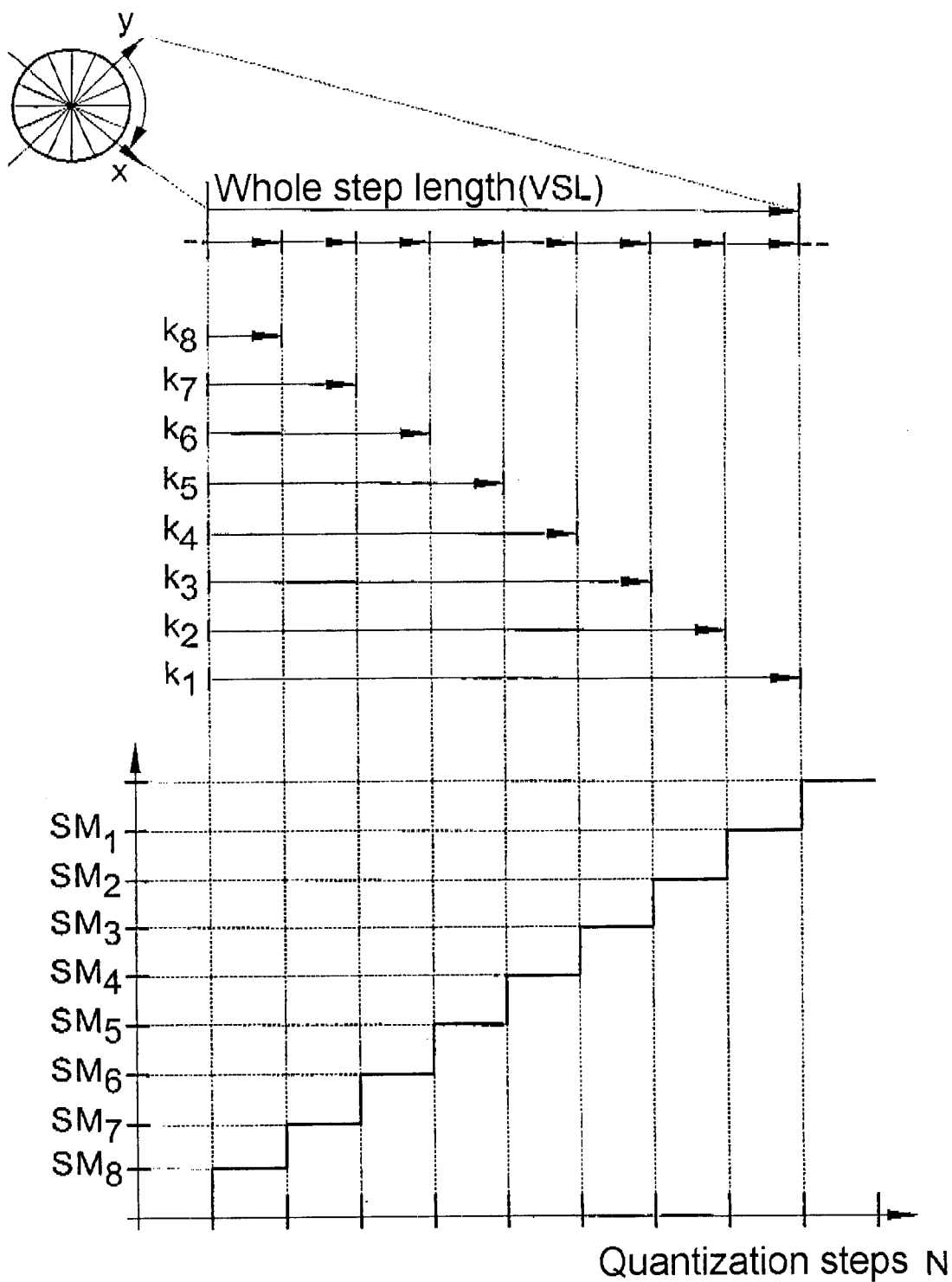
FIG. 1 shows an example for the division of a whole step length into microsteps.

First, it will be explained with reference to FIG. 1 how microsteps are brought about. To this end, the torque vectors of a stepping motor are shown in FIG. 1 in the upper left-hand part of the drawing. In this case, the quarter-rotation between direction axis Y and direction axis X corresponds to a complete rotating field rotation.

This rotating field rotation should correspond to a whole step length (VSL) which is carried over to the diagram in the middle of the drawing. The microsteps result from partial rotations of the rotating field and are shown in the upper left-hand portion of the drawing as a series of diameters. For the sake of clarity, the quantity of microsteps is limited here to only z=8. Therefore, the displacement distance initiated with every microstep corresponds to an eighth of the displacement distance initiated with a whole step.

Accordingly, when the equivalence $k_1=8$ is assigned to the stepping motor $SM_1$, for example, its specific step length $SL_1$ follows from $SL_1=k_1/z=8/8$ with eight microsteps or a whole step length. Depending on the control pulse or cycle of the base frequency $f_a$, a displacement distance of eight microsteps is achieved with this stepping motor $SM_1$.

However, a stepping motor $SM_5$ with an assigned equivalence $k_5=4$, for example, travels only half of the path, namely, four microsteps, with the same sequence of control pulses (see FIG. 1).

As a result, the stepping motors $SM_1, SM_2 \ldots SM_n$ travel at different speeds depending on the assigned equivalents $k_1, k_2 \ldots k_n$. For example, when the very precise speed gradation based on z=100 microsteps is carried out instead of z=8, it can easily be seen that a very precise positioning of the various component groups is possible according to this principle.

Figure 2:
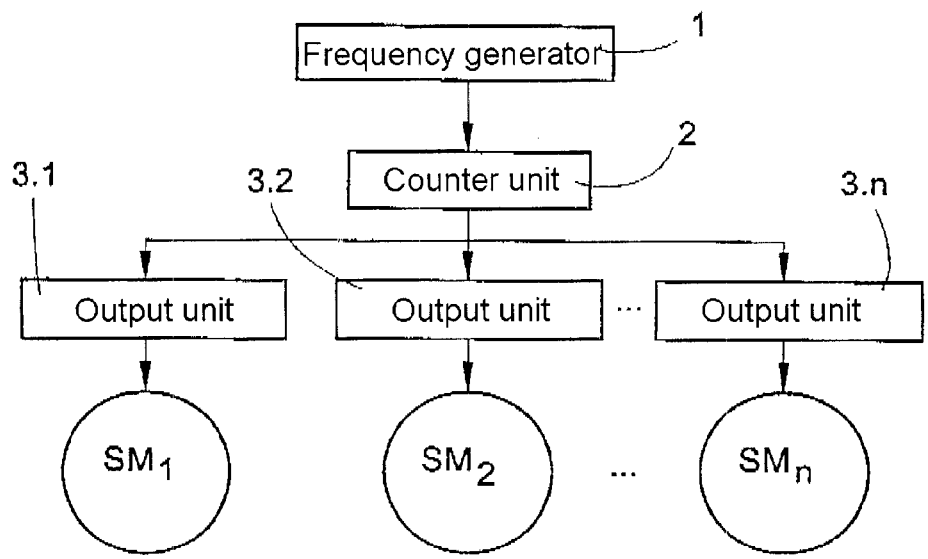
FIG. 2 shows an example for the control, according to the invention, of a plurality of stepping motors.

An example for the control, according to the invention, of a plurality of stepping motors $SM_1, SM_2 \ldots SM_n$ is shown in FIG. 2. In this case, a frequency generator 1 is followed by a counter unit 2 which is linked with stepping motors $SM_1, SM_2 \ldots SM_n$ via output units 3.1, 3.2 ... 3.n. In this regard, the base frequency $f_a$ is predetermined with the frequency generator 1 and the conversion of the base frequency $f_a$ into a pulse sequence corresponding to the respective desired displacement distance of the component group is carried out by the counter unit 2 and the output of the actual currents for position control of the rotating field for every individual stepping motor $SM_1, SM_2 \ldots SM_n$ is carried out depending on the predetermined specific step length $SL_1, SL_2 \ldots SL_n$ via output units 3.1, 3.2 ... 3.n.

Figure 3:
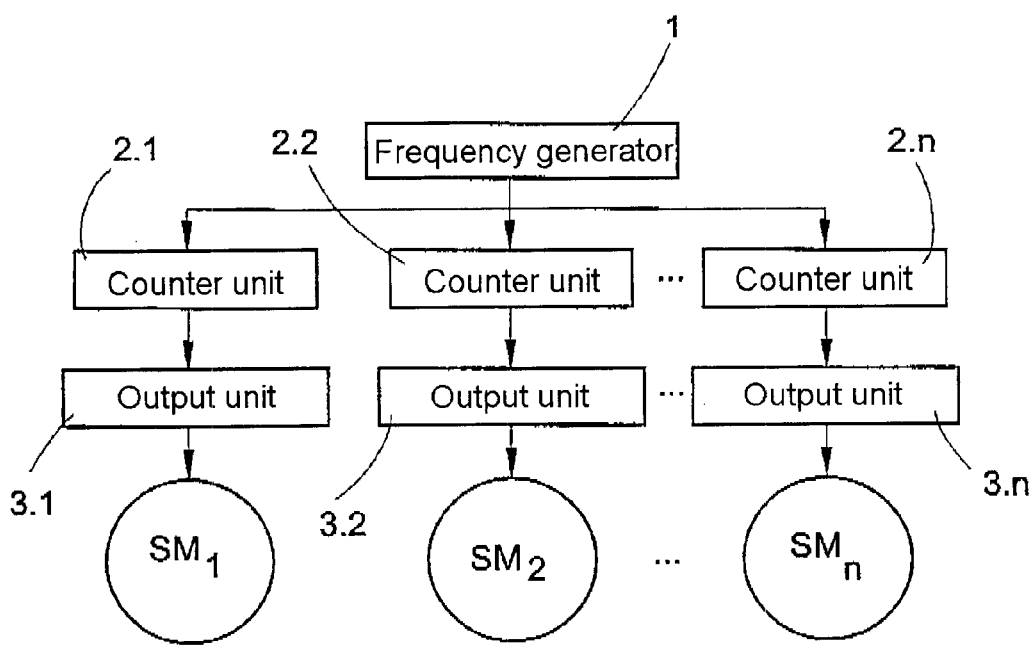
FIG. 3 shows, in comparison to FIG. 2, the control of a plurality of stepping motors within a positioning system as known in the prior art.

The advantage of the method according to the invention will be apparent from a comparison of FIG. 2 and FIG. 3; the procedure of synchronized control according to the prior art is shown in FIG. 3. It will be seen from this comparison that, instead of a plurality of counter units 2.1, 2.2 ... 2.n, one of which is assigned in each instance to one of the stepping motors $SM_1, SM_2 \ldots SM_n$ in FIG. 3, only one common counter unit 2 is needed in FIG. 2 and, therefore, in accordance with the invention.

The advantage resulting from the application of the invention essentially consists in reduced expenditure on hardware and software. Further to the described example, a synchronized through-switching signal can be used and the output units 3.1, 3.2 . . . 3.n can also be combined in one output unit which operates all motors in multiplex operation.

Further, it is advantageous that as many stepping motors as desired can be incorporated in a positioning system without a significant increase in expenditure for control.

The entire positioning system can be accelerated or decelerated by changing the base frequency $f_a$ alone, wherein the quantization error remains constant. In addition, the quantization error can be calculated in a simple manner and can therefore be kept under better control.

Another substantial advantage consists in the improvement in the smooth running of all synchronized motors because the stepping output is always carried out at the same times, thus preventing overlap of the control frequencies. Because of this, the method according to the invention is also very well suited in connected with nonlinear acceleration ramps.

It follows from all of the above that the positioning system according to the invention is suitable particularly for application in zoom objectives with any desired quantity of zoom groups.

While the foregoing description and drawings represent the present invention, it will be obvious to those skilled in the art that various changes may be made therein without departing from the true spirit and scope of the present invention.

Reference Numbers 1 frequency generator
2 counter unit
3 output unit
X,Y direction axes
k equivalent
z microstep
$SL_1$, $SL_2$, $SL_n$ step lengths
$SM_1$, $SM_2$, $SM_n$ stepping motors
$f_a$ base frequency

What is claimed is:

1. A method for the synchronized control of a plurality of stepping motors $SM_1$, $SM_2$ . . . $SM_n$ which serve as drives in a feed system, comprising the steps of:
    controlling stepping motors $SM_1$, $SM_2$ . . . $SM_n$ at a base frequency $f_a$, wherein a cycle of the base frequency $f_a$ is proportional to a given feed step length SL; and
    triggering different step lengths $SL_1$, $SL_2$ . . . $SL_n$ with each cycle of the same base frequency $f_a$ in the individual stepping motors $SM_1$, $SM_2$ . . . $SM_n$, wherein a specific step length $SL_1$ is associated with stepping motor $SM_1$, a specific step length $SL_2$ is associated with stepping motor $SM_2$, and so forth.

2. The method according to claim 1, wherein the stepping motor $SM_1$ is operated in whole step operation, wherein the step length given by a complete rotating field rotation in the stepping motor $SM_1$ is assigned to the latter as step length $SL_1$, while step lengths $SL_2$, $SL_3$ . . . $SL_n$ corresponding to a partial rotating field rotation in the respective stepping motors $SM_2$, $SM_3$ . . . $SM_n$ are assigned to the rest of the stepping motors $SM_2$, $SM_3$ . . . $SM_n$.

3. The method according to claim 1, wherein a rotating field rotation is divided into a microsteps and $SL_1=k_1/z$, $SL_2=k_2/z$ . . . $SL_n=k_n/z$ is true for step lengths $SL_1$, $SL_2$ . . . $SL_n$, where equivalents $k_1$ . . . $k_1$ are a measurement for the quantity of microsteps to be predetermined for a stepping motor $SM_1$, $SM_2$ . . . $SM_n$.

4. The method according to claim 1, wherein the paths with characteristic feed positions, such as starting positions, reversing positions and/or stopping positions, are assigned to the individual stepping motors $SM_1$, $SM_2$ . . . $SM_n$ within the feed system, and the step lengths $SL_1$, $SL_2$ . . . $SL_n$ and equivalents $k_2$, $k_3$ . . . $k_n$, depending on the distances between characteristic feed positions on the paths, are predetermined in such a way that the feed on the paths is caused at different speeds when all stepping motors $SM_1$, $SM_2$ . . . $SM_n$ are controlled with the same sequence of cycles of the base frequency $f_a$, so that the characteristic feed positions are reached at the conclusion of the sequence on all paths.

* * * * *